April 1, 1941.    R. CADWALLADER ET AL    2,236,670
BUMPER AND STONE DEFLECTOR
Filed July 8, 1939
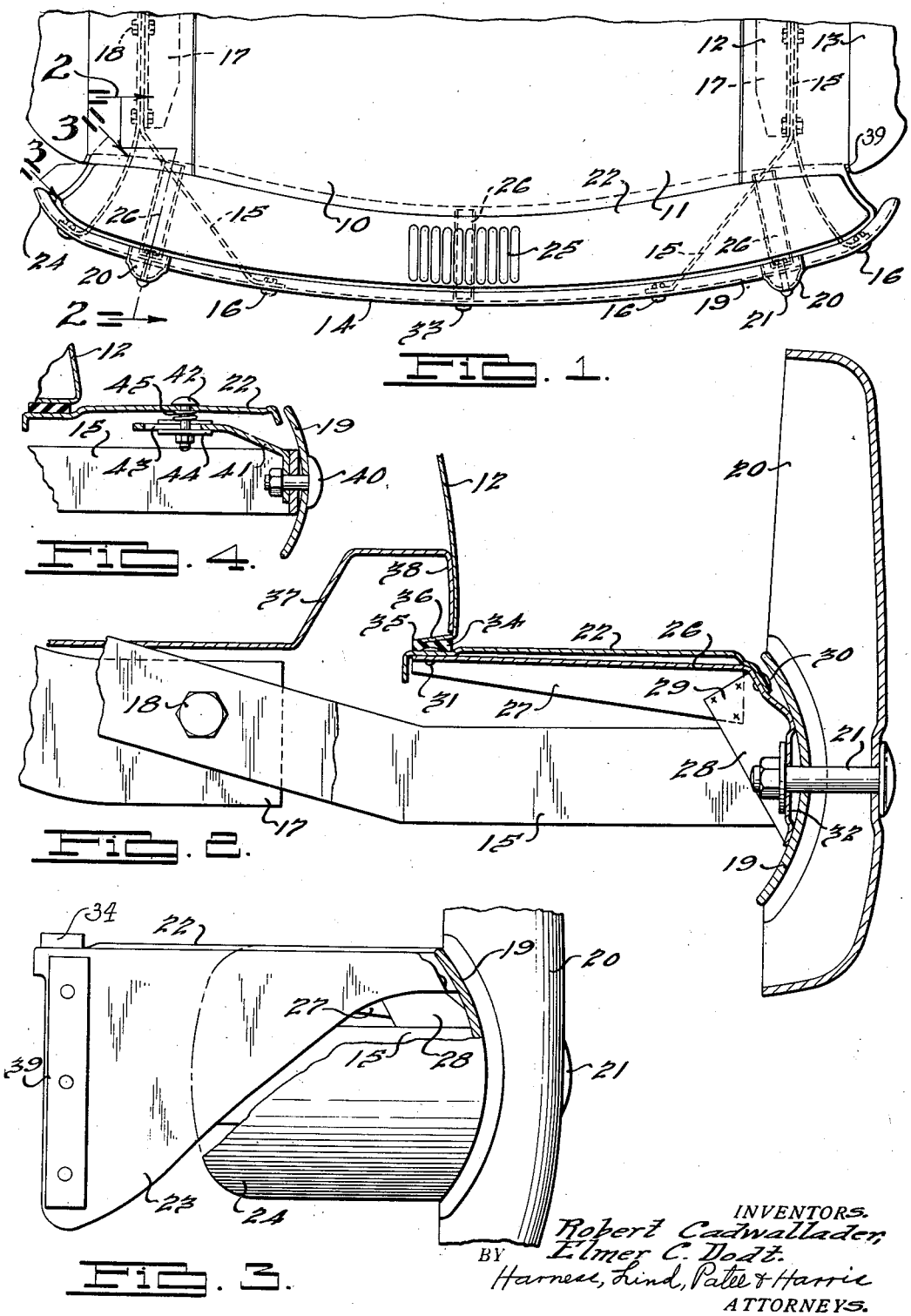

Patented Apr. 1, 1941

2,236,670

UNITED STATES PATENT OFFICE 2,236,670

BUMPER AND STONE DEFLECTOR

Robert Cadwallader and Elmer C. Dodt, Detroit, Mich., assignors to Chrysler Corporation, Highland Park, Mich., a corporation of Delaware Application July 8, 1939, Serial No. 283,428

7 Claims. (Cl. 293—55)

This invention relates to automobile bumper structures and in particular to a combined bumper bar and stone guard structure.

It is an object of the invention to provide a combined bumper bar and stone guard structure which shall have a pleasing appearance, will be economical to manufacture and which will effectively prevent stones, gravel, etc. thrown upward by the rear wheels of the car from damaging the rear deck portion of the body.

Recent trends of automobile body design have been toward the streamline form which has resulted in a gradual sloping of the rear deck portion of the body in a downward and rearward direction. Due to the fact that the body panelling is continued downwardly to the extreme lower rear end of the body, it has been necessary to provide some means of shielding the rear deck portion from flying stones, gravel, etc. thrown upwardly by the rear wheels.

In some instances a shield member has been provided, this member being attached to the top or bottom edges of the bumper supporting arms. Generally speaking, this expedient has proven unsatisfactory because either clearance was provided between the shield and the body and between the shield and the bumper, in which event a considerable amount of flying gravel passed upwardly by the shield, or the shield completely filled the space between the body and bumper, in which case, the shield (and frequently the body) was damaged every time a blow was received by the bumper of sufficient force to cause it to move inwardly toward the body appreciably.

In the present construction, described and claimed herein, the body panelling ends at the level of the stone shield and the latter extends from the bumper bar to the rear bottom portion of the body and preferably thereunder for a short distance. This construction allows the shield to pass inwardly toward and underneath the body upon movement of the bumper bar toward the body, thus preventing damage either to the shield or to the body. In addition, the shield of the present construction completely fills the space between the bumper bar and the rear of the body thus preventing entirely damage to the latter by flying stones, etc. besides presenting a solid appearance which considerably enhances the appearance of the body as a whole.

Other objects and advantages of the invention will be apparent to one skilled in the art as the description progresses.

Reference is made to the accompanying drawing which illustrates two preferred embodiments of the device and in which reference numerals are used to designate corresponding parts in the following specification.

In the drawing,

Fig. 1 is a plan view of the rear end of an automobile body showing the improved bumper and stone shield structure mounted in place.

Fig. 2 is a sectional view along the line 2—2 of Fig. 1.

Fig. 3 is a view, partly in section, taken approximately along the line 3—3 of Fig. 1.

Fig. 4 is a view corresponding to Fig. 2, but showing a modified form of the invention.

Referring now to Figs. 1, 2 and 3, the rear deck portion of the automobile body is generally indicated at 10, the lid or cover for the rear luggage compartment at 11, the body side panels at 12 and the fenders at 13. A rear bumper structure, generally indicated at 14, is fastened to a pair of bumper supporting bars 15 by suitable bolts 16. The bumper supporting bars 15 are of the well-known spring type and are fastened to the rear ends of the chassis side sills 17 by suitable bolts 18.

The bumper structure comprises an impact bar 19 to which are fastened a plurality of upright guard members 20 by means of bolts 21. Two guard members are illustrated, it being obvious that any number might be provided as desired.

The stone shield member 22 extends the full width of the body and is shaped in cross section as shown in Fig. 2. At each end of the shield a downwardly turned portion is provided as shown in Fig. 3. This downwardly turned portion is of such shape that it cooperates with the forwardly turned end portion 24 of the bar 19 to effectively conceal the support bars 15 and present a neat and solid appearance.

The shield 22 is preferably made of light gauge sheet metal and has a plurality of decorative beads 25 in its upper surface. It is supported by the bumper structure through the intermediary of the relatively rigid cantilever support members 26, three of which are provided, but more or less than three may be used without departing from the invention. These support members 26 are preferably of metal and have a pair of bent flanges 27 and 28 welded together at 29 to provide rigidity. They each have a depressed portion 32 which has a hole for the reception of the bolt 21 which serves the dual purpose of fastening the shield support 26 as well as the guard 20 to the bar 19. At the center, the support 26 may be fastened to the bar 19 by a short bolt 33 or a long bolt like 21 may be provided if a center guard member is fitted.

The shield 22 is fastened to the supports 26 in any suitable manner, as by rivets 30, 31. At its inner edge it is provided with a sealing member 34 preferably of rubber which has a ridge 35 along its inner edge against which the inturned flange 36 of the body panel 12 is adapted to seat. The numeral 37 designates the floor of the rear body compartment which is welded to the panel 12 along the flange 38.

At each end of the stone guard, the flange 23 is provided with a rubbing strip 39 of felt or other suitable material which prevents rattle or squeak from accidental contact between the flange 23 and the fender.

It will be apparent from the aforesaid that the stone guard 22 may slide underneath the rear of the body upon impact of the bar 19 against a solid object thus preventing damage to the guard and/or the rear body panels. Ordinary shocks received by the bar 19 during parking, etc., are generally not of sufficient force to cause the seal 34 to be separated from contact with the flange 36. If a severe blow is received upon the bar 19 such as during a collision, the guard 22 slides under the rear of the body and is undamaged.

Fig. 4 illustrates a modification of the invention wherein the stone shield 22 is mounted on the bumper structure by means of a plurality of cantilever support brackets 41 which are fastened to the bumper bar 19 by bolts 40 which also secure the bar 19 to the support arms 15. The shield 22 is supported on each of the brackets 41 through the intermediary of a bolt 42 which extends through an elongated slot 43 in the bracket. A pair of washers 44 are provided to grip the upper and lower surfaces of the bracket 41 and these washers are kept tight by the coil spring 45 which also serves to yieldably support the shield 22 as shown.

The construction shown in Fig. 4 accommodates inaccuracies in manufacturing and assembling and also permits the bumper bar 19 to spring in and out slightly without disturbing the position of the shield.

While the invention has been described in connection with a rear bumper construction, it is of course obvious that the invention could be applied to a front bumper construction without departing from the spirit of the invention.

Having thus described two preferred embodiments of our invention, we wish to point out that various changes in the details thereof may be made by those skilled in the art without departing from the scope and spirit of the same, and it is not intended to limit the invention in its broader sense except as set forth in the appended claims.

We claim:

1. In a motor vehicle having a body and frame construction, a bumper having an impact bar spaced from said body and extending completely across said vehicle at one end thereof; a stone shield secured to said bumper and completely filling the space between said impact bar and said body; the securing means thereof comprising a cantilever bracket secured to said impact bar and extending toward said body for supporting said shield in a plane substantially aligned with the top edge of said impact bar.

2. In a motor vehicle including a rear body and frame construction and a rear bumper having an impact bar spaced from and extending completely across said body; a stone shield secured to said bumper and completely filling the space between said impact bar and the rear end of said body; the securing means thereof comprising a cantilever bracket secured to said impact bar and extending toward said body for supporting said shield in a plane substantially in alignment with the top edge of said impact bar.

3. In a motor vehicle including a body and frame structure and a bumper having an impact bar spaced from said body structure, a stone and gravel deflecting structure secured to said bumper and extending entirely across one end of said body and completely filling the space between the bar and body at the level of the top edge of the bar, and a sealing member carried by one of said structures and including a recessed portion adapted to be engaged by the other of said structures thereby to form a releasable connection between the same.

4. In a motor vehicle including a body and frame structure and a bumper having an impact bar spaced from said body structure, a stone and gravel deflecting structure secured to said bumper and extending toward said body, and a sealing member carried by one of said structures comprising a resilient strip having a groove adapted to be engaged by a flange on the other of said structures.

5. In combination with a vehicle bumper having an impact bar spaced from the body of the vehicle, a stone deflector supported by said impact bar and comprising a plate-like member secured to said impact bar by means of a bracket, and a yieldable connection between said plate member and said bracket for permitting adjustment of said member relative to said bar during assembly and relative movement between said member and bar during impact of said bar with a solid object.

6. In a motor vehicle including a frame, body and a bumper having an impact bar disposed transversely across said body, means supporting said bumper on said frame comprising a support arm structure secured to said frame and to said bar respectively, a stone shield slidably mounted on said bumper and extending between said bar and said body for substantially the entire length of said bar, said body terminating at approximately the level of said shield to accommodate movement of said shield underneath said body upon flexure of said supporting means and/or impact bar.

7. In a motor vehicle including a frame, body and a bumper having an impact bar disposed transversely across said body, means supporting said bumper on said frame comprising a support arm structure secured to said frame and to said bar respectively, a bracket carried by said bumper, a stone shield mounted on said bracket independently of said body and bar and extending between said bar and said body for substantially the entire length of said bar, said body terminating downwardly at the level of said shield to accommodate movement of said shield toward said body upon flexure of said supporting means and/or impact bar.

ROBERT CADWALLADER.
ELMER C. DODT.